(12) United States Patent
Huang et al.

(10) Patent No.: US 10,602,533 B2
(45) Date of Patent: *Mar. 24, 2020

(54) METHOD, APPARATUS, AND SYSTEM FOR IMPLEMENTING DATA SCHEDULING

(71) Applicant: Huawei Technologies Co., Ltd., Shenzhen, Guangdong (CN)

(72) Inventors: Qufang Huang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 201 days.

This patent is subject to a terminal disclaimer.

(21) Appl. No.: 14/292,235

(22) Filed: May 30, 2014

(65) Prior Publication Data

US 2014/0307663 A1    Oct. 16, 2014

Related U.S. Application Data

(63) Continuation of application No. PCT/CN2012/085110, filed on Nov. 23, 2012.

(30) Foreign Application Priority Data

Nov. 30, 2011 (CN) .......................... 2011 1 0390443

(51) Int. Cl.
*H04W 72/04* (2009.01)
*H04W 72/12* (2009.01)

(52) U.S. Cl.
CPC .... *H04W 72/1268* (2013.01); *H04W 72/1284* (2013.01)

(58) Field of Classification Search
None
See application file for complete search history.

(56) References Cited

U.S. PATENT DOCUMENTS

| 8,934,360 B2 * | 1/2015 | Dai | H04W 72/1221 370/252 |
| 9,008,050 B2 * | 4/2015 | Feuersanger | H04W 52/281 370/336 |

(Continued)

FOREIGN PATENT DOCUMENTS

| CN | 101686577 A | * 3/2010 |
| CN | 101925128 A | 12/2010 |

(Continued)

*Primary Examiner* — Willie J Daniel, Jr.
(74) *Attorney, Agent, or Firm* — Leydig, Voit & Mayer, Ltd.

(57) ABSTRACT

A method, an apparatus, and a system for implementing data scheduling are provided. By adopting the method, the apparatus, and the system in embodiments of the present invention, a BSR is generated when uplink data that needs to be sent exists; and by using the BSR and correspondence between a logical channel and a base station, a UE can transmit the uplink data on a logical channel that corresponds to a base station, thereby avoiding a problem that data cannot be processed because a radio resource and a logical channel correspond to different base stations, so that the UE can transfer data to be uploaded to a correct base station corresponding thereto, which greatly improves efficiency of data scheduling in a mode of carrier aggregation between base stations.

12 Claims, 5 Drawing Sheets

(56) References Cited

U.S. PATENT DOCUMENTS

| | | | |
|---|---|---|---|
| 9,282,493 B2* | 3/2016 | Ahluwalia | H04W 36/02 |
| 9,794,779 B2* | 10/2017 | Li | H04W 28/0278 |
| 2010/0003981 A1* | 1/2010 | Ahluwalia | H04W 36/02 |
| | | | 455/436 |
| 2010/0272091 A1* | 10/2010 | Fabien | H04W 52/365 |
| | | | 370/345 |
| 2011/0243106 A1 | 10/2011 | Hsu et al. | |
| 2012/0099452 A1 | 4/2012 | Dai et al. | |
| 2012/0149298 A1* | 6/2012 | Jiang | H04W 72/1252 |
| | | | 455/7 |
| 2013/0083677 A1* | 4/2013 | Kim | H04W 72/1284 |
| | | | 370/252 |
| 2014/0348105 A1* | 11/2014 | Rosa | H04W 72/1284 |
| | | | 370/329 |
| 2015/0230082 A1* | 8/2015 | Li | H04W 28/0278 |
| | | | 370/252 |
| 2018/0027474 A1* | 1/2018 | Wang | H04B 7/155 |
| | | | 370/315 |

FOREIGN PATENT DOCUMENTS

| | | |
|---|---|---|
| CN | 102036390 A | 4/2011 |
| CN | 102111751 A | 6/2011 |
| CN | 101932019 A | 12/2012 |
| EP | 2244514 A1 | 10/2010 |
| GB | 2477649 A | 8/2011 |
| WO | WO 2011097812 A1 | 8/2011 |

* cited by examiner

| 1 | 1 | 0 | 0 | 0 | 0 | 0 | 0 |
|---|---|---|---|---|---|---|---|
| BSR #0 | | | | | | BSR #1 | |
| BSR #1 | | | | BSR #2 | | | |
| BSR #2 | | BSR #3 | | | | | |
| BSR #0 | | | | | | BSR #1 | |
| BSR #1 | | | | BSR #2 | | | |
| BSR #2 | | BSR #3 | | | | | |
| ...... | | | | | | | |
| ...... | | | | | ...... | | |
| ...... | | | ...... | | | | |
| ...... | | ...... | | | | | |

FIG. 3

| BSR #0 | BSR #1 |
|---|---|
| BSR #1 | BSR #2 |
| BSR #2 | BSR #3 |
| BSR #0 | BSR #1 |
| BSR #1 | BSR #2 |
| BSR #2 | BSR #3 |
| ...... | |
| ...... | ...... |
| ...... | ...... |
| ...... | ...... |

METHOD, APPARATUS, AND SYSTEM FOR IMPLEMENTING DATA SCHEDULING

CROSS-REFERENCE TO RELATED APPLICATIONS

This application is a continuation of International Patent Application No. PCT/CN2012/085110, filed on Nov. 23, 2012, which claims priority to Chinese Application No. 201110390443.2, filed on Nov. 30, 2011, both of which are hereby incorporated by their entities.

TECHNICAL FIELD

The present invention relates to the field of communications technologies, and in particular, to a method, an apparatus, and a system for implementing data scheduling.

BACKGROUND

With the development of mobile communications technologies, a system can provide an increasingly high transmission rate and quality of service, and a user service also imposes an increasingly high requirement on the transmission rate. To ensure a rate for general users, and meanwhile, to provide a higher throughput for a part of users, in a situation where substantial increase of a configuration bandwidth is avoided, the 3GPP (third generation partnership project) introduces a carrier aggregation (Carrier Aggregation, CA) technology. Its solution is mainly that a user equipment (User Equipment, UE) may simultaneously use a plurality of component carriers (Component Carrier, CC) to perform uplink and downlink communication, thereby supporting data transmission at a high rate. When a user rate is lowered, some component carriers may be released and only one primary carrier is maintained, so that a released transmission resource may be used by another user, thereby achieving an objective of flexible and dynamic transmission.

According to a base station position where an aggregated carrier is located, carrier aggregation in an LTE (Long Term Evolution, long term evolution) system may be classified into manners, such as cell aggregation inside a base station and cell aggregation between base stations. The cell aggregation inside a base station means that component carriers simultaneously used by a UE are all controlled by the same base station, and the cell aggregation between base stations means that component carriers simultaneously used by a UE are controlled by different base stations. According to types of base stations where aggregated carriers are located, the cell aggregation between base stations may further be classified into manners, such as cell aggregation between macro base stations, and cell aggregation between a macro base station and a home base station (Home eNB, HeNB).

Because a shared channel is adopted for data transmission in the LTE system, after a UE establishes an RB (Radio Bearer, radio bearer) connection, if the UE has uplink data that needs to be sent, the UE requests a resource from an eNB (evolved NodeB, evolved base station) and transfers the uplink data by using an uplink resource allocated by the eNB. In a normal situation, the UE requests a resource from an eNB mainly through an SR (Scheduling Request, scheduling request) and a BSR (Buffer Status Report, buffer status report). Through the SR, the UE can only notify the eNB whether data to be transmitted exists, and the SR is sent by using a dedicated resource; and in a manner of the BSR, the UE can notify the eNB of the amount of the data to be transmitted, and the BSR is sent by using a shared resource, that is, a resource used for sending the BSR also needs to be obtained through a request made by the UE to the eNB.

In a mode of carrier aggregation, a UE may have a plurality of logical channels working simultaneously; and in a mode of carrier aggregation inside a base station, logical channels corresponding to cells are uniformly classified into groups. When the base station configures logical channel groups, correspondence between a logical channel and a cell is not considered, that is, logical channels in one logical channel group may correspond to one cell and may also correspond to different cells. After receiving a BSR, the eNB does not determine which cell corresponds to a logical channel having data to be transmitted. Therefore, the eNB only allocates an uplink resource of any one aggregated carrier to the UE, and after receiving the uplink data, the eNB may distribute the uplink data to processing entities of logical channels for processing.

However, in a mode of carrier aggregation between base stations, because logical channels of the UE may be distributed on a plurality of eNBs at a network side, if a manner of reporting a BSR in the mode of carrier aggregation inside a base station is continued to be used, the eNB cannot determine which cell corresponds to a logical channel having data to be sent, and if a cell where an allocated uplink resource is located and a cell corresponding to the logical channel belong to different eNBs, it may causes that data cannot be correctly processed.

SUMMARY

In view of this, embodiments of the present invention provide a method, an apparatus, and a system for implementing data scheduling, so that a UE can transfer data to be uploaded to a correct base station corresponding thereto.

To solve the foregoing problem, technical solutions provided in the embodiments of the present invention are as follows:

A method for implementing data scheduling is applied in a communication system of carrier aggregation across base stations eNBs and includes: obtaining correspondence between a logical channel and a base station; generating, by using the correspondence between the logical channel and the base station, a buffer status report BSR of the base station that corresponds to the logical channel on which uplink data is located; and reporting the BSR, and transmitting the uplink data on a radio resource allocated by the base station that corresponds to the logical channel on which the uplink data is located.

Another method for implementing data scheduling is applied in a communication system of carrier aggregation across base stations eNBs and includes: notifying a user equipment UE of correspondence between a logical channel and a base station; receiving a BSR reported by the UE, where the BSR is a BSR that is generated by the UE by using the correspondence and corresponds to the base station that corresponds to the logical channel on which uplink data is located; and allocating, according to the BSR, to the UE a radio resource used for transmitting the uplink data.

An apparatus for implementing data scheduling is located in a communication system of carrier aggregation across base stations eNBs and includes: an obtaining unit, a generating unit, and a reporting unit. The obtaining unit is configured to obtain correspondence between a logical channel and a base station; the generating unit is configured to generate, by using the correspondence between the logical channel and the base station, a BSR of the base station that corresponds to the logical channel on which uplink data is located; and the reporting unit is configured to report the BSR generated by the generating unit, and transmit the uplink data on a radio resource allocated by the base station that corresponds to the logical channel on which the uplink data is located.

Another apparatus for implementing data scheduling is located in a communication system of carrier aggregation across base stations eNBs and includes: a notifying unit, a receiving unit, and an allocating unit, where the notifying unit is configured to notify a UE of correspondence between a logical channel and a base station; the receiving unit is configured to receive a BSR reported by the UE, where the BSR is a BSR that is generated by the UE by using the correspondence and corresponds to the base station that corresponds to the logical channel on which uplink data is located; and the allocating unit is configured to allocate, according to the BSR received by the receiving unit, to the UE a radio resource used for transmitting the uplink data.

A system for implementing data scheduling includes a UE and a plurality of eNBs. The UE is configured to obtain correspondence between a logical channel and a base station, and generate, by using the correspondence, a BSR of a base station that corresponds to the logical channel on which uplink data is located; and report the BSR, and transmit uplink data on a radio resource allocated by the base station that corresponds to the logical channel. The base station is configured to notify the UE of the correspondence between the logical channel and the base station; receive the BSR of the base station that corresponds to the logical channel on which the uplink data is located, where the BSR is reported by the UE; and allocate, according to the BSR, to the UE the radio resource used for transmitting the uplink data.

It can be seen that, by adopting the method, the apparatus, and the system of the embodiments of the present invention, in a mode of carrier aggregation between base stations, by clarifying correspondence between a logical channel and a base station, a BSR is generated when uplink data that needs to be sent exists; and by using the BSR and the correspondence between a logical channel and a base station, a UE can send uplink data on the logical channel that corresponds to the base station on a radio resource allocated by the base station, thereby avoiding a problem that data cannot be processed because a radio resource and a logical channel correspond to different base stations, so that the UE can transfer data to be uploaded to a correct base station corresponding thereto, which greatly improves efficiency of data scheduling in the mode of carrier aggregation between base stations.

BRIEF DESCRIPTION OF DRAWINGS

To describe the technical solutions in the embodiments of the present invention more clearly, the accompanying drawings required for describing the embodiments or the prior art are introduced briefly in the following. Apparently, the accompanying drawings in the following description show only some of the embodiments of the present invention, and persons of ordinary skill in the art may still obtain other drawings according to these accompanying drawings without creative efforts.

DESCRIPTION OF EMBODIMENTS

The technical solutions in the embodiments of the present invention are clearly and described in the following with reference to the accompanying drawings in the embodiments of the present invention. Apparently, the embodiments to be described are only a part rather than all of the embodiments of the present invention. All other embodiments obtained by persons skilled in the art based on the embodiments of the present invention without creative efforts shall fall within the protection scope of the present invention.

Figure 1:
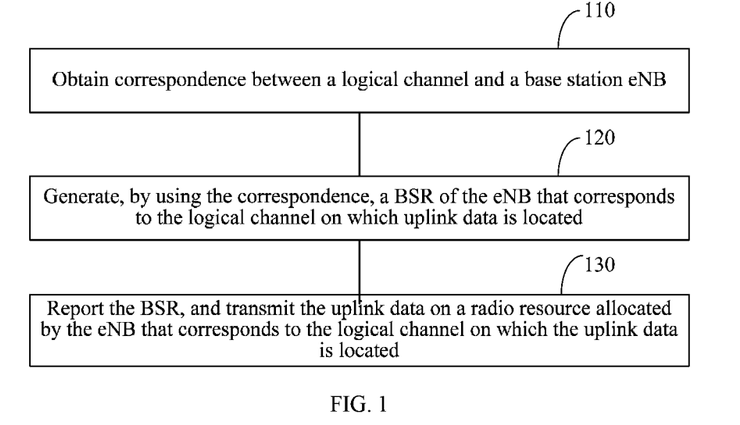
FIG. 1 is a schematic flow chart of a method for implementing data scheduling according to Embodiment 1 of the present invention.

Embodiment 1 of the present invention provides a method for implementing data scheduling, which may be applied in systems, such as LTE (Long Term Evolution, long term evolution communication system), UMTS (Universal Mobile Telecommunication System, universal mobile telecommunication system), GSM (Global System of Mobile communication, global system of mobile communication), and WiFi (wireless fidelity, wireless fidelity). In this embodiment of the present invention, only an LTE system is taken as an example for description. Specifically, as shown in FIG. 1, the method includes:

Step 110: Obtain correspondence between a logical channel and an eNB.

In a scenario of carrier aggregation across eNBs, when configuring a new RB (Radio Bearer, radio bearer) for a UE, a network side notifies the UE of correspondence between a logical channel that corresponds to the RB and an eNB. Correspondingly, when obtaining the RB configured by the network side, the UE may obtain the correspondence between the logical channel that corresponds to the RB and the eNB.

It should be noted that the UE may obtain the correspondence between the logical channel and the eNB from any eNB, for example, the UE may receive an RB configured by a P-eNB (Primary evolved NodeB, primary base station) for the UE, where the configuration signaling includes correspondence between a logical channel X that corresponds to the RB and the P-eNB; and the UE may also receive an RB configured by an S-eNB (Secondary evolved NodeB, component base station) for the UE, where the configuration signaling includes correspondence between a logical channel Y that corresponds to the RB and the S-eNB.

It should be clarified that the configuration signaling for configuring the RB may be sent from any eNB, that is, that the logical channel X corresponds to the P-eNB does not mean that configuration signaling of the logical channel X is definitely sent by the P-eNB, and the configuration signaling of the logical channel X may also be sent by the S-eNB. Likewise, that the logical channel Y corresponds to the S-eNB does not mean that configuration signaling of the logical channel Y is definitely sent by the S-eNB, and the configuration signaling of the logical channel Y may also be sent by the P-eNB. Alternatively, the network side may also configure two RBs through one piece of configuration signaling, and logical channels corresponding to the two RBs respectively correspond to the P-eNB and the S-eNB. However, in the method of this embodiment, no matter the configuration signaling is sent by which eNB, the correspondence between a logical channel and an eNB therein remains unchanged.

Step 120: When uplink data that needs to be sent exists, generate, by using the correspondence between a logical channel and an eNB, a BSR of an eNB that corresponds to a logical channel on which the uplink data is located.

Figure 2:
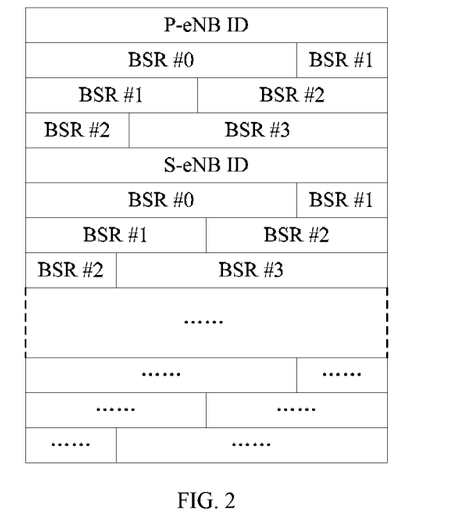
FIG. 2 is a schematic diagram of a format of a BSR generated in the method according to Embodiment 1 of the present invention.

In an actual application, the BSR includes the amount of uplink data to be transmitted on a logical channel group to which the logical channel that corresponds to the eNB belongs (hereinafter referred to as "on logical channels") and an identifier of the eNB. In a format of a BSR shown in FIG. 2, Buffer #0 indicates the amount of data to be transmitted on logical channels in a group 0, Buffer #1 indicates the amount of data to be transmitted on logical channels in a group 1, Buffer #2 indicates the amount of data to be transmitted on logical channels in a group 2, and Buffer #3 indicates the amount of data to be transmitted on logical channels in a group 3, and the rest can be obtained by analogy. In the BSR shown in FIG. 2, an eNB ID is adopted to represent the identifier of the eNB, as shown in FIG. 2, a P-eNB ID is adopted to represent that a first BSR corresponds to the P-eNB, and an S-eNB ID is adopted to represent that a second BSR corresponds to the S-eNB, and the rest can be obtained by analogy.

Figure 3:
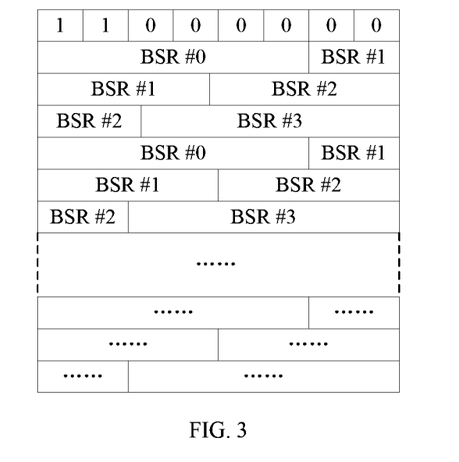
FIG. 3 is a schematic diagram of another format of a BSR generated in the method according to Embodiment 1 of the present invention.

Definitely, other manners may also be adopted for the identifier of the eNB in the BSR. As shown in FIG. 3, a bitmap is adopted to represent the identifier of the eNB in the BSR, and each eNB corresponds to one bit. For example, if the tbit is 1, it represents that data that is to be transmitted and corresponds to the eNB exists in the BSR, and if the bit is 0, it represents that no data that is to be transmitted and corresponds to the eNB exists in the BSR.

Figure 4:
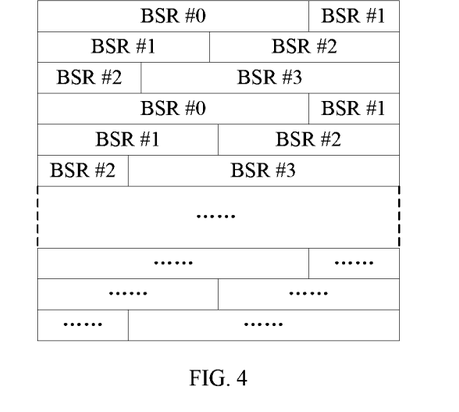
FIG. 4 is a schematic diagram of yet another format of a BSR generated in the method according to Embodiment 1 of the present invention.

In addition, as shown in FIG. 4, the identifier of the eNB in the BSR may also be represented in a manner of a preset sequence. In this manner, reported BSRs corresponding to eNBs are arranged in a preset sequence, where the preset sequence may be based on an eNB ID, and may also be based on an eNB index (base station index). For example, a first BSR corresponds to the P-eNB by default, or a last BSR corresponds to the P-eNB by default, or a BSR corresponding to the P-eNB is placed at another fixed position, which is not specifically described in this embodiment.

Step 130: Report the BSR, and transmit the uplink data on a radio resource allocated by the eNB that corresponds to the logical channel on which the uplink data is located.

Specifically, an uplink resource allocated by the eNB may be used to report the BSR to the eNB, which specifically includes, but is not limited to, the following two manners.

A. The BSR of the eNB is reported by using an uplink resource allocated by the eNB that corresponds to the logical channel on which the uplink data is located. After the BSR of the eNB that corresponds to the logical channel on which the uplink data is located is generated, an uplink resource of the corresponding eNB is expected, and after the uplink resource allocated by the eNB that corresponds to the logical channel on which the uplink data is located is obtained, the corresponding BSR is reported to the eNB. For example, if uplink data that needs to be sent exists on the logical channel X on which the RB configured by the P-eNB is located, after the BSR of the P-eNB is generated, it is only after the P-eNB allocates an uplink resource to the UE that the UE can report the BSR to the P-eNB on the uplink resource allocated by the P-eNB, and the BSR of the P-eNB cannot be sent on an uplink resource allocated by the S-eNB. Likewise, if uplink data that needs to be sent exists on the logical channel Y on which the RB configured by the S-eNB is located, after the BSR of the S-eNB is generated, it is only after the S-eNB allocates an uplink resource to the UE that the UE can report the BSR to the S-eNB on the uplink resource allocated by the S-eNB, and the BSR of the S-eNB cannot be sent on an uplink resource allocated by the P-eNB.

B. BSRs of all eNBs are reported by using an uplink resource allocated by any eNB. For example, if uplink data that needs to be sent exists on both the logical channel X on which the RB configured by the P-eNB is located and the logical channel Y on which the RB configured by the S-eNB is located, after the BSRs of the P-eNB and the S-eNB are generated, if an uplink resource allocated by the P-eNB to the UE is received, the BSRs of the P-eNB and the S-eNB are reported to the P-eNB on the uplink resource; and likewise, if an uplink resource allocated by the S-eNB to the UE is received, the BSRs of the P-eNB and the S-eNB are reported to the S-eNB on the uplink resource.

Figure 5:
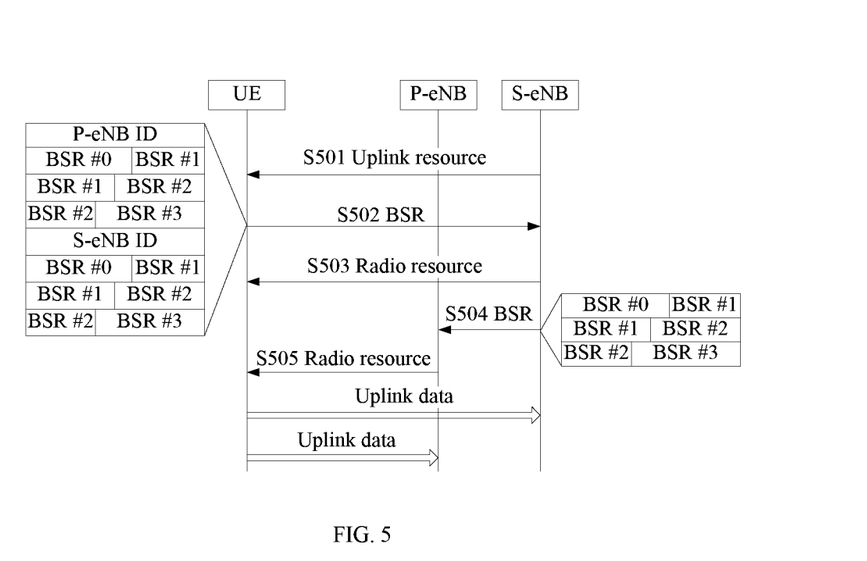
FIG. 5 is a partial schematic flow chart of a method for implementing data scheduling according to Embodiment 2 of the present invention.

FIG. 5 shows a method for implementing data scheduling according to Embodiment 2 of the present invention. In this embodiment, when configuring an RB, a network side notifies a UE of correspondence between a logical channel and an eNB. If the UE has uplink data that needs to be sent, the UE may generate a BSR shown in FIG. 2, FIG. 3 or FIG. 4. After a procedure that the UE reports a BSR is triggered, an uplink resource received first is used to send the BSR no matter which eNB the uplink resource is located on. As shown in FIG. 5, the method may include:

S501: An S-eNB allocates an uplink resource to the UE. In this embodiment, the uplink resource allocated by the S-eNB to the UE may be sent to the UE through an uplink grant (UL Grant).

S502: The UE reports the BSR to the S-eNB by using the uplink resource allocated by the S-eNB.

Persons skilled in the art may understand that a format of the BSR reported by the UE, as shown in FIG. 5, may be the format of the BSR described in FIG. 2, FIG. 3, or FIG. 4.

S503: After the S-eNB receives the BSR reported by the UE, if the BSR includes a resource request for the S-eNB (that is, the UE has uplink data that needs to be transmitted to the S-eNB), the S-eNB allocates, to the UE, a radio resource used for transmitting the uplink data.

S504: If the BSR further includes a resource request for a P-eNB, the S-eNB notifies, through an X2 interface, the P-eNB to allocate a radio resource to the UE.

As shown in FIG. 5, the S-eNB sends a BSR of the P-eNB to the P-eNB, so as to notify the P-eNB to allocate a radio resource to the UE.

S505: The P-eNB allocates, to the UE, the radio resource used for transmitting the uplink data.

Therefore, the UE may send the uplink data to the corresponding eNBs according to the radio resources allocated in S503 and S505.

Figure 6:
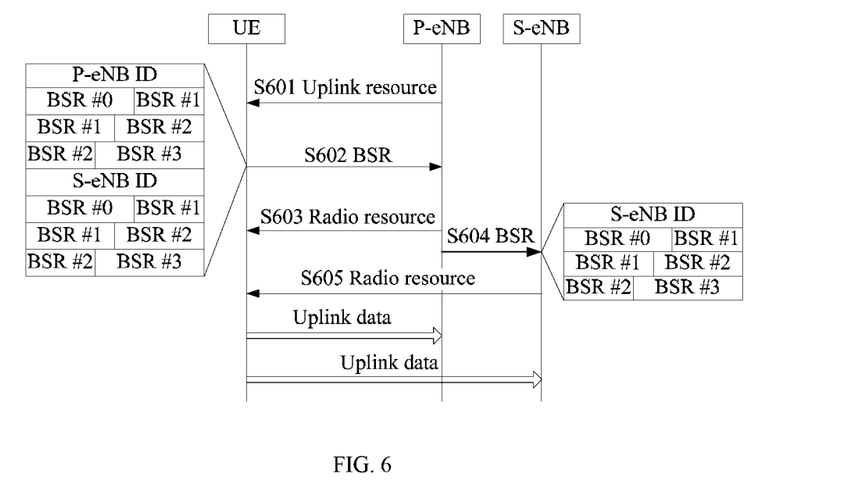
FIG. 6 is a partial schematic flow chart of a method for implementing data scheduling according to Embodiment 3 of the present invention.

FIG. 6 shows a method for implementing data scheduling according to Embodiment 3 of the present invention. In this embodiment, when configuring an RB, a network side notifies a UE of correspondence between a logical channel and an eNB. If the UE has uplink data that needs to be sent, the UE may generate a BSR shown in FIG. 2, FIG. 3 or FIG. 4. After a procedure that the UE reports a BSR is triggered, it is only after an uplink resource of a P-eNB is received that the BSR can be sent to the P-eNB. After the P-eNB receives the BSR, if it is found that a BSR corresponding to another eNB exists, the P-eNB selects the BSR which is related to a specific eNB and forwards the corresponding BSR to a corresponding S-eNB. As shown in FIG. 6, the method may include:

S601: The P-eNB allocates an uplink resource to the UE.

S602: The UE reports the BSR to the P-eNB by using the uplink resource allocated by the P-eNB.

S603: After the P-eNB receives the BSR reported by the UE, if the BSR includes a resource request for the P-eNB (that is, the UE has uplink data that needs to be transmitted to the P-eNB), the P-eNB allocates, to the UE, a radio resource used for transmitting the uplink data.

S604: If the BSR includes a BSR corresponding to the S-eNB, the BSR corresponding to the S-eNB is stripped off and forwarded to the S-eNB.

S605: The S-eNB allocates, to the UE, a radio resource used for transmitting the uplink data.

Therefore, the UE may transmit the uplink data to the corresponding eNBs according to the radio resources allocated in S603 and S605.

Figure 7:
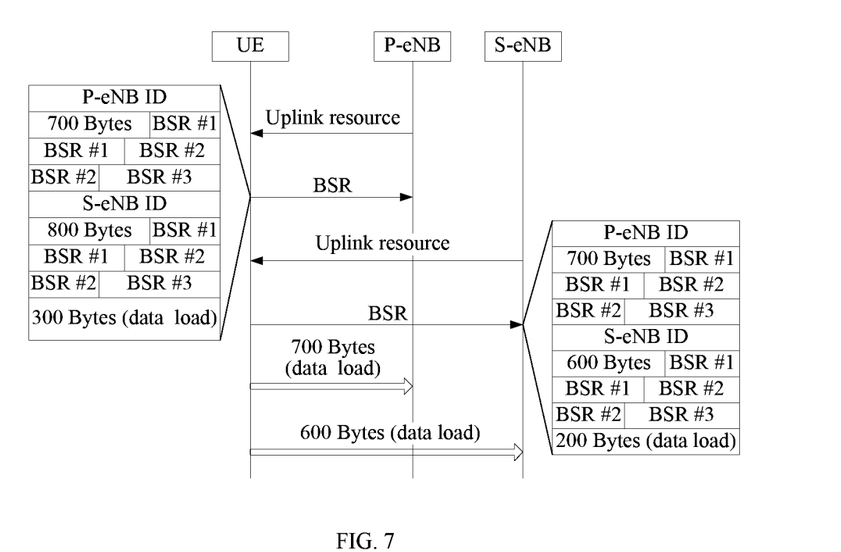
FIG. 7 is a partial schematic flow chart of a method for implementing data scheduling according to Embodiment 4 of the present invention.

FIG. 7 shows a method for implementing data scheduling according to Embodiment 4 of the present invention. In this embodiment, when configuring an RB, a network side notifies a UE of correspondence between a logical channel and an eNB. After a procedure that the UE reports a BSR is triggered, the UE always report, according to eNBs and in the BSR, data to be transmitted in all logical channel groups. For example, as shown in FIG. 7, 1000 Bytes (bytes) of uplink data and 800 Bytes of uplink data respectively exist on logical channels 0 that correspond to a P-eNB and an S-eNB respectively. After the UE generates a BSR and receives an uplink resource allocated by the P-eNB, the UE sends the BSR and 300 Bytes of uplink data to the P-eNB by using the uplink resource. The BSR notifies the network side that 700 Bytes of uplink data to be transmitted still remains on the logical channel 0 that corresponds to the P-eNB, and 800 Bytes of uplink data to be transmitted still remains on the logical channel 0 that corresponds to the S-eNB. Then, after the UE receives an uplink resource allocated by the S-eNB, the UE sends a BSR and 200 Bytes of uplink data by using the uplink resource. The BSR notifies the network side that 700 Bytes of uplink data to be transmitted still remains on the logical channel 0 that corresponds to the P-eNB, and 600 Bytes of uplink data to be transmitted still remains on the logical channel 0 that corresponds to the S-eNB. The rest can be done by analogy until all the uplink data is sent.

After the BSR is reported to the eNB, the eNB finds that the UE has uplink data that needs to be transmitted, and allocates a radio resource to the UE. After receiving a radio resource allocated by one eNB, the UE determines, according to the obtained correspondence between an eNB and a logical channel, a logical channel corresponding to the eNB that allocates the radio resource, and transmits, by using the radio resource, the uplink data on the determined logical channel corresponding to the eNB. For uplink data on another logical channel that does not correspond to the eNB that allocates the radio resource, the radio resource is not adopted for transmission.

It can be seen that, by adopting the methods of the foregoing embodiments, in a mode of carrier aggregation between base stations, a BSR including correspondence between a logical channel and an eNB is generated; and by using the BSR and the correspondence between a logical channel and an eNB, a UE can send uplink data on the logical channel that corresponds to the eNB on a radio resource allocated by the eNB, thereby avoiding a problem that data cannot be processed because a radio resource and a logical channel correspond to different eNBs, so that the UE can transfer data to be uploaded to a correct eNB corresponding thereto, which greatly improves efficiency of data scheduling in the mode of carrier aggregation between base stations.

Figure 8:
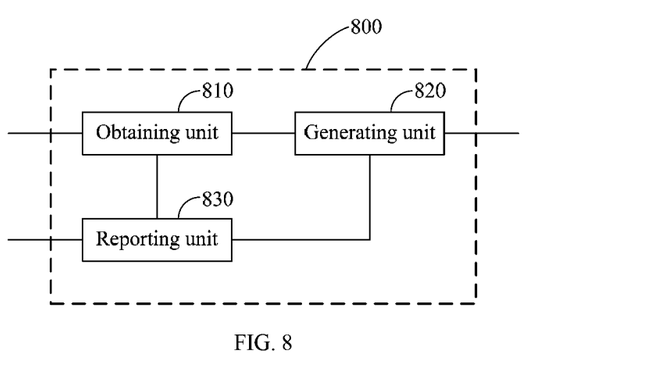
FIG. 8 is a schematic structural diagram of an apparatus for implementing data scheduling according to Embodiment 5 of the present invention.

Based on the foregoing idea, Embodiment 5 of the present invention further provides an apparatus for implementing data scheduling. As shown in FIG. 8, the apparatus 800 includes: an obtaining unit 810, a generating unit 820, and a reporting unit 830, where the obtaining unit 810 is configured to obtain correspondence between a logical channel on which an RB is located and an eNB;

the generating unit 820 is configured to, when uplink data that needs to be sent exists, generate, by using the correspondence between a logical channel and an eNB, a BSR of an eNB that corresponds to a logical channel on which the uplink data is located, where the BSR generated by the generating unit 820 includes the amount of uplink data to be transmitted on a logical channel group to which the logical channel on which the uplink data is located belongs and an identifier of the eNB that corresponds to the logical channel on which the uplink data is located; and the reporting unit 830 is configured to report the BSR generated by the generating unit 820, and transmit the uplink data on a radio resource allocated by the eNB that corresponds to the logical channel on which the uplink data is located.

The reporting unit 830 includes (not shown in the figure): a first processing module and/or a second processing module, where the first processing module is configured to report the BSR of the eNB by using an uplink resource allocated by the eNB that corresponds to the logical channel on which the uplink data is located; and the second processing module is configured to report BSRs of all eNBs by using an uplink resource allocated by any eNB. In addition, the reporting unit 830 may further include (not shown in the figure): a third processing module that sends the uplink data by using the uplink resource and notifies the eNB of the amount of uplink data to be transmitted on each logical channel.

It should be noted that the reporting unit 830 may further include (not shown in the figure): a determining module and a transmitting module, where the determining module is configured to determine, according to the obtained correspondence between an eNB and a logical channel, a logical channel corresponding to the eNB that allocates the radio resource; and the transmitting module is configured to transmit, by using the radio resource, uplink data on the logical channel determined by the determining module.

Figure 9:
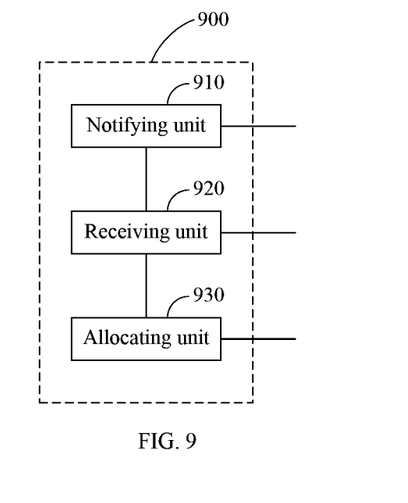
FIG. 9 is a schematic structural diagram of an apparatus for implementing data scheduling according to Embodiment 6 of the present invention.

Based on the same idea, Embodiment 6 of the present invention also provides an apparatus for implementing data scheduling. As shown in FIG. 9, the apparatus 900 includes: a notifying unit 910, a receiving unit 920, and an allocating unit 930.

The notifying unit 910 is configured to, when an RB is configured for a UE, notify the UE of correspondence between a logical channel on which the RB is located and an eNB, where the correspondence notified by the notifying unit 910 is correspondence between one eNB and its logical channel or correspondence between all eNBs and their logical channels.

The receiving unit 920 is configured to allocate an uplink resource to the UE and receive a BSR reported by the UE, where the BSR is a BSR that is generated by the UE by using the correspondence and corresponds to an eNB that corresponds to a logical channel on which uplink data is located, and the BSR received by the receiving unit 920 includes the amount of uplink data to be transmitted on logical channels in the group the logical channel on which the uplink data is located and an identifier of the eNB that corresponds to the logical channel on which the uplink data is located.

In addition, the receiving unit 920 may further include (not shown in the figure): a first judging module and a second judging module, where the first judging module is configured to determine whether the received BSR includes a resource request for another eNB; and if includes, notify the another eNB to allocate a radio resource to the UE, so as to transmit uplink data on a logical channel that corresponds to the another eNB; and the second judging module is configured to determine whether a BSR corresponding to another eNB exists in the received BSR; and if exists, forward the BSR corresponding to the another eNB to the another eNB.

The allocating unit 930 is configured to allocate, according to the BSR received by the receiving unit 920, to the UE a radio resource used for transmitting the uplink data on the logical channel that corresponds to the eNB.

It should be noted that persons skilled in the art easily know that the apparatus for implementing data scheduling described in Embodiment 2 may also exist as a constituent part of a UE, and the apparatus for implementing data scheduling described in Embodiment 3 may exist as a constituent part of an eNB; meanwhile, both may also exist as a constituent part of a system for implementing data scheduling, which can also implement sending of uplink data to a corresponding correct eNB; therefore, another system including the apparatus in the foregoing embodiment may also fall within the protection scope of this application, which is not described herein again.

Persons of ordinary skill in the art may be further aware that, the exemplary units and the steps of algorithms according to the embodiments disclosed in this specification can be implemented by electronic hardware, computer software, or a combination of the two. In order to describe the interchangeability of the hardware and the software clearly, the compositions and steps of the embodiments are generally described according to functions in the foregoing description. Whether these functions are executed in a hardware or software manner depends upon the particular application and design constraint conditions of the technical solutions. Persons skilled in the art may use different methods to implement the described functions for each particular application, but it should not be considered that such implementation goes beyond the scope of the embodiments of the present invention.

In combination with the embodiments disclosed in this specification, steps of the method or algorithm described may be directly implemented by using hardware, a software module executed by a processor, or a combination of the two.

Based on the foregoing description of the disclosed embodiments, persons of ordinary skill in the art can implement or apply the embodiments of the present invention. Various modifications of the embodiments are apparent to persons of ordinary skill in the art, and general principles defined in the specification may be implemented in another embodiment without departing from the spirit or scope the embodiments of the present invention. Therefore, the embodiments of the present invention are not limited to these embodiments shown in this specification, but conform to a broadest range consistent with a principle and a novel characteristic disclosed in this specification.

The foregoing descriptions are only exemplary embodiments of the present invention, but are not intended to limit the embodiments of the present invention. Any modification, equivalent replacement, or improvement made within the spirit and principle of the embodiments of the present invention shall all fall within the protection scope of the embodiments of the present invention.

What is claimed is:

1. A method for implementing data scheduling in a network at least including a user equipment device (UE), a primary base station and a secondary base station, the method comprising:
   receiving, by the UE, a notification of a logical channel corresponding to the primary base station when the primary base station configures a first radio bearer for the UE and a logical channel corresponding to the secondary base station when the secondary base station configures a second radio bearer for the UE, wherein the UE is served by both the primary base station and the secondary base station;
   receiving, by the UE, a first resource indication indicating a first uplink resource allocated by the primary base station on at least one component carrier and a second resource indication indicating a second uplink resource allocated by the secondary base station on at least one component carrier;
   transmitting, by the UE to the primary base station and subsequent to the notification of the logical channel corresponding to the primary base station being received, using the first uplink resource allocated by the primary base station, a first buffer status report (BSR) comprising an amount of first uplink data on a logical channel group to which the logical channel corresponding to the primary base station belongs; and
   transmitting, by the UE to the secondary base station and subsequent to the notification of the logical channel corresponding to the secondary base station being received, using the second uplink resource allocated by the secondary base station, a second BSR comprising an amount of second uplink data on a logical channel group to which the logical channel corresponding to the secondary base station belongs.

2. The method according to claim 1, wherein the UE receives the notification through a signaling for configuring a radio bearer.

3. The method according to claim 1, wherein
   the first BSR further comprises an identifier of the primary base station; and
   the second BSR further comprises an identifier of the secondary base station.

4. The method according to claim 3, wherein
   the identifier of the primary base station or the secondary base station is represented in a manner of a base station number, a bitmap, or a preset sequence.

5. The method according to claim 1, further comprising:
   receiving, by the UE, a radio resource allocation indicating a radio resource from the primary base station; and
   transmitting, by the UE, the first uplink data, on the radio resource.

6. The method according to claim 1, further comprising:
receiving, by the UE, a radio resource allocation indicating a radio resource from the secondary base station; and
transmitting, by the UE, the second uplink data, on the radio resource from the secondary base station.

7. A user equipment (UE) device in a network at least including the UE, a primary base station and a secondary base station, the UE comprising:
a receiver,
a transmitter, and
a processor configured to execute computer-executable instructions on a non-transitory computer-readable medium to cooperate with the receiver and the transmitter to carry out, on the UE, a method comprising:
receiving a notification of a logical channel corresponding to the primary base station when the primary base station configures a first radio bearer for the UE and a logical channel corresponding to the secondary base station when the secondary base station configures a second radio bearer for the UE, wherein the UE is served by both the primary base station and the secondary base station;
receiving a first resource indication indicating a first uplink resource allocated by the primary base station on at least one component carrier and a second resource indication indicating a second uplink resource allocated by the secondary base station on at least one component carrier;
transmitting, to the primary base station and subsequent to the notification of the logical channel corresponding to the primary base station being received, using the first uplink resource allocated by the primary base station, a first buffer status report (BSR) comprising an amount of first uplink data on a logical channel group to which the logical channel corresponding to the primary base station belongs; and
transmitting, to the secondary base station and subsequent to the notification of the logical channel corresponding to the secondary base station being received, using the second uplink resource allocated by the secondary base station, a second BSR comprising an amount of second uplink data on a logical channel group to which the logical channel corresponding to the secondary base station belongs.

8. The UE according to claim 7, wherein the UE receives the notification through a signaling for configuring a radio bearer.

9. The UE according to claim 7, wherein
the first BSR further comprises an identifier of the primary base station; and
the second BSR further comprises an identifier of the secondary base station.

10. The UE according to claim 9, wherein
the identifier of the primary base station or the secondary base station is represented in a manner of a base station number, a bitmap, or a preset sequence.

11. The UE according to claim 7, wherein the method further comprises:
receiving a radio resource allocation indicating a radio resource from the primary base station; and
transmitting the first uplink data, on the radio resource from the primary base station.

12. The UE according to claim 7, wherein the method further comprises:
receiving a radio resource allocation indicating a radio resource from the secondary base station; and
transmitting the second uplink data, on the radio resource from the secondary base station.

* * * * *